(12) United States Patent
Hong et al.

(10) Patent No.: US 8,693,611 B2
(45) Date of Patent: Apr. 8, 2014

(54) LIQUID-METAL-COOLED FAST REACTOR CORE COMPRISING NUCLEAR FUEL ASSEMBLY WITH NUCLEAR FUEL RODS WITH VARYING FUEL CLADDING THICKNESS IN EACH OF THE REACTOR CORE REGIONS

(75) Inventors: Ser Gi Hong, Daejeon (KR); Yeong-Il Kim, Daejeon (KR); Sang Ji Kim, Daejeon (KR); Do-Hee Hahn, Daejeon (KR)

(73) Assignees: Korea Atomic Energy Research Institute (KR); Korea Hydro & Nuclear Power Co., Ltd. (KR)

( * ) Notice: Subject to any disclaimer, the term of this patent is extended or adjusted under 35 U.S.C. 154(b) by 910 days.

(21) Appl. No.: 12/443,519

(22) PCT Filed: Oct. 16, 2007

(86) PCT No.: PCT/KR2007/005053
§ 371 (c)(1),
(2), (4) Date: Mar. 30, 2009

(87) PCT Pub. No.: WO2008/048031
PCT Pub. Date: Apr. 24, 2008

(65) Prior Publication Data
US 2010/0135452 A1    Jun. 3, 2010

(30) Foreign Application Priority Data

Oct. 16, 2006    (KR) .................. 10-2006-0100415

(51) Int. Cl.
*G21C 3/32* (2006.01)

(52) U.S. Cl.
USPC ........................... 376/436; 376/426; 376/416

(58) Field of Classification Search
USPC .................. 376/412–425, 428–431
See application file for complete search history.

(56) References Cited

U.S. PATENT DOCUMENTS 3,215,607 A * 11/1965 Lackey .................... 376/455
3,736,225 A *  5/1973 Barker et al. ............. 376/174

(Continued)

FOREIGN PATENT DOCUMENTS

JP    09-166679 A    6/1997
JP    2006-126147 A    5/2006

OTHER PUBLICATIONS

Safety Analysis for Key Design Features of Kalimer-600 Design Concept, KAERI/TR-2968/2005, Dated Mar. 2005.*

(Continued)

*Primary Examiner* — Timothy A Brainard
(74) *Attorney, Agent, or Firm* — Fredrikson & Byron, P.A.

(57) ABSTRACT

A liquid-metal cooled fast reactor core having a nuclear fuel assembly constituted of nuclear fuel rods with varying cladding thicknesses in reactor core regions, in which: the nuclear fuel assembly (1) of a liquid-metal cooled fast reactor includes nuclear fuel assemblies (1a, 1b and 1c) in inner, middle and outer reactor core regions, respectively, and is installed in a hexagonal duct (3) with nuclear fuel materials (2-2a, 2-2b and 2-2c) surrounded by respective claddings (2-1a, 2-1b and 2-1c), and the claddings (2-1a, 2-1b and 2-1c) of a nuclear fuel rod (2a) in the inner reactor core region, a nuclear fuel rod (2b) in the middle reactor core region and a nuclear fuel rod (2c) in the outer reactor core region are formed at different thicknesses. The reactor core can flatten power distribution using a single-enrichment nuclear fuel in the liquid-metal cooled fast reactor.

7 Claims, 8 Drawing Sheets

(56) References Cited

U.S. PATENT DOCUMENTS 4,362,696 A * 12/1982 Brehm et al. ................ 376/417
5,299,241 A    3/1994 Suzuki et al.

OTHER PUBLICATIONS

Mizuno, T. et al., "Advanced Core Design Studies with Oxide and Metal Fuels for Next Generation Sodium Cooled Fast Reactors," Proceedings of ICCAP '05, Paper 5159, May 2005, pp. 1-7.

Hong, Ser Gi et al, "A New Design Concept of the Kalimer-600 Core," Proceedings of ICAPP 2007, Paper 7506, , May 2007, 7 pgs.

Hejzlar, Pavel et al., "Conceptual Neutronic Design of a Lead-Bismuth-Cooled Actinide Burning Reactor," Nuclear Science and Engineering: 139, 2001, pp. 138-155.

"PCT International Search Report dated Jan. 29, 2008 for PCT/KR2007/005053, from which the instant application is based," 2 pgs.

* cited by examiner

Figure 8

| Design Factor | Design Value |
|---|---|
| Core Power Output(MWe) | |
| Core Thermal Output(MWt) | 1523.4 |
| Cycle Length(EFPM) | 10 |
| Number of Batches for Nuclear Fuel Management IC/MC/OC | 4/4/4/ |
| Active Core Height(cm) | 100 |
| Number of Nuclear Fuel Assemblies IC/MC/OC | 114/78/138 |
| Number of Control Rod Assemblies | 18 |
| Number of Reflector Assemblies | 72 |
| Number of B4C Reflector Assemblies | 78 |
| Number of IVSs | 114 |
| Number of Radial Shields | 90 |
| Number of USS Assemblies | 1 |
| Total Number of Assemblies | 703 |
| Number of Nuclear Fuel Rods per Nuclear Fuel Assembly | 271 |
| Thickness of Wall of Assembly Duct(mm) | 3.7 |
| Assembly inner flat-to-flat(mm) | 17.568 |
| Assembly outer flat-to-flat(mm) | 18.308 |
| Assembly Pitch(cm) | 18.708 |
| Gap between Ducts(mm) | 4 |
| Nuclear Fuel | TRU-U(depleted uranium)-10Zr |
| Outer Diameter of Nuclear Fuel Rod(mm) | 9.0 |
| Cladding Thickness of Nuclear Fuel Rod(mm) IC/MC/OC | 1.02/0.74/0.59 |
| Swear Density of Nuclear Fuel(smear density)(%TD) | 75 |
| Outer Diameter of Nuclear Fuel Slug(mm, IC/MC/OC) | 6.03/6.51/6.77 |
| Wire wrap Diameter(mm) | 1.4 |
| Gap between Nuclear Fuel Rod and Wire Wrap | 1 |
| Ratio of Grid Pitch to Rod Diameter | 1.1667 |
| Upper end plug(cm) | 2.54 |
| Lower end plug and shielding(cm) | 111.76 |
| Fission gas plenum length(cm) | 156.25 |
| Length of Nuclear Fuel Rod(cm) | 370.55 |

LIQUID-METAL-COOLED FAST REACTOR CORE COMPRISING NUCLEAR FUEL ASSEMBLY WITH NUCLEAR FUEL RODS WITH VARYING FUEL CLADDING THICKNESS IN EACH OF THE REACTOR CORE REGIONS

RELATED APPLICATIONS

This application is a 35 U.S.C. 371 national stage filing from International Application No. PCT/KR2007/005053 filed Oct. 16, 2007, which claims priority to Korean Application No. 10-2006-0100415, filed Oct. 16, 2006, the teachings of which are incorporated herein by reference.

TECHNICAL FIELD

The present invention relates, in general, to a liquid-metal cooled fast reactor, and more particularly, to a nuclear fuel assembly and a core for a liquid-metal cooled fast reactor, in which the nuclear fuel assembly has nuclear fuel rods having different cladding thicknesses in reactor core regions, includes a nuclear fuel assembly in an inner reactor core region, a nuclear fuel assembly in a middle reactor core region, which surrounds the nuclear fuel assembly of the inner reactor core region, and a nuclear fuel assembly in an outer reactor core region, which surrounds the nuclear fuel assembly of the middle reactor core region, and is installed in a hexagonal duct with nuclear fuel materials surrounded by respective claddings, and in which the claddings of a nuclear fuel rod in the inner reactor core region, a nuclear fuel rod in the middle reactor core region and a nuclear fuel rod in the outer reactor core region are formed at different thicknesses, thereby being able to effectively flatten power distribution using a single-enrichment nuclear fuel in the liquid-metal cooled fast reactor.

BACKGROUND ART

Growing interest has recently been taken in the development of fourth generation nuclear reactors, which alleviate international resistance to nuclear proliferation (i.e. the spread of nuclear weapons). Among them, it has been reported that a sodium cooled fast reactor has entered the step just before commercialization, because the technology thereof has been considerably developed.

Thus, in several countries, including the USA, Japan and Russia, nuclear reactor design concepts that obviate a blanket and use a single-enrichment nuclear fuel in order to alleviate resistance to the spread of liquid-metal nuclear reactors, have been suggested.

Each blanket contains depleted uranium or natural uranium, and is characterized by the production of nuclear-grade plutonium when loaded into a reactor core.

However, since the blanket increases the breeding ratio of nuclear fuel, the obviation of the blanket has an advantage in that it basically blocks the production of nuclear-grade plutonium, thus alleviating resistance based on fears of nuclear proliferation, but has a disadvantage in that it has a lower breeding ratio.

The use of the single-enrichment nuclear fuel maintains a constant breeding ratio in each reactor core region, and thus limits the frequency of changes in power distribution over time.

Accordingly, the single-enrichment nuclear fuel facilitates the design of an orifice required for flow distribution.

In Korea, a sodium-cooled reactor of 600 MWe has already been designed, thus both obviating the blankets and using the single-enrichment nuclear fuel. In a core of the sodium-cooled reactor, in order to flatten the power distribution using the single-enrichment nuclear fuel, a non-nuclear fuel rod, such as a B4C rod, a ZrH2 rod, or a vacancy rod, has been used for a nuclear fuel assembly.

However, the design of such a nuclear fuel assembly is complicated compared to that of a known nuclear fuel assembly. When the B4C or ZrH2 rod is irradiated at high temperature, the soundness of this non-nuclear fuel rod containing this compound becomes a problem.

Particularly, in the case of the ZrH2 rod, because hydrogen is emitted at a high temperature of 550° C., the soundness of cladding has become a known problem.

The general concept of a high-capacity sodium-cooled fast reactor is based on the use of the blankets and variation of fuel enrichment in each reactor core region in order to flatten power distribution. In the case where the single-enrichment nuclear fuel is used, a method of properly disposing the blankets in the middle of the reactor core as well as in the reactor core has been used.

In a lead-cooled fast reactor, BREST, which has recently been proposed in Russia, a method of varying the outer diameter of the nuclear fuel rod in each reactor core region instead of avoiding variation in fuel enrichment has been adopted. Further, an attempt has been made to alleviate resistance to nuclear proliferation by obviating the blanket.

The concept of the BREST is based on the use of lead as a coolant and nitride as a nuclear fuel.

However, with this method, it is difficult to maintain the size of the nuclear fuel assembly consistent due to the difference between the outer diameters of the nuclear fuel rods, when applied to the case of using a sodium-cooled reactor, particularly, a duct and a wire wrap.

The Japan Nuclear Cycle Development Institute (JNC) has proposed a method of maintaining both the outer diameter of the nuclear fuel rod and the thickness of the cladding uniform and of varying the content of zirconium (Zr) in the nuclear fuel surrounded by the cladding in each reactor core region.

Regarding this method, however, the predominant opinion is that the performance and production of the nuclear fuel become a problem.

The reason is as follows. According to results released from the US Argonne National Laboratory, the optimal content of Zr is generally 10 wt %, and when the content of Zr is less than 10 wt %, eutectic and melting temperatures of a metal fuel do not become sufficiently high, and re-distribution of elements may create a region where the content of Zr is abruptly reduced. In contrast, when the content of Zr is more than 10 wt %, the melting temperature of a fuel core becomes higher than that of a quartz tube when the nuclear fuel is produced.

JNC has also proposed a method of simultaneously varying the content of Zr in each reactor core region and adjusting the smear density of the metal fuel.

However, according to a study on the smear density of the metal fuel, reported by US Argonne National Laboratory, the optimal smear density of the metal fuel is 75% TD, and when it is higher than this value, the soundness of the nuclear fuel become a problem.

According to the design concepts of an encapsulated nuclear heat source (ENHS), a small-size ultra-long cycle lead-cooled fast reactor, which is being studied under the control of California State University at Berkeley in the USA, an attempt has been made to maintain the size and components of the nuclear fuel rod uniform in all of the reactor core regions, and to adjust the power distribution by increasing the area of a non-nuclear fuel region in the middle of the fuel core.

In this case, however, it is found that the area of the non-nuclear fuel region in the middle of the fuel core is increased such that the peak power factor is maintained less than 1.5, and thus the breeding ratio is considerably reduced.

According to the ENHS design concepts, another method of maintaining the design specification and components of each nuclear fuel rod in each reactor core region uniform and of varying only the distance between the nuclear fuel rods has been released.

This method, however, is suitable for a small-size reactor core that makes no use of a duct and a wire wrap, but not for a large-size reactor core, which uses the duct and the wire wrap.

DISCLOSURE

Technical Problem

Accordingly, the present invention has been made in an effort to solve the problems occurring in the related art, and an object of the present invention is to provide a nuclear fuel assembly having nuclear fuel rods of different cladding thicknesses in reactor core regions in a liquid-metal cooled fast reactor, in which the nuclear fuel assembly has nuclear fuel rods, each of which has a cladding thicknesses varied in each reactor core region, and in which claddings of the nuclear fuel rod in an inner reactor core region, the nuclear fuel rod in a middle reactor core region and the nuclear fuel rod in an outer reactor core region are formed at different thicknesses without using any non-nuclear fuel rods, thereby being able to effectively flatten power distribution using a single-enrichment nuclear fuel in the liquid-metal cooled fast reactor.

Technical Solution

In order to achieve the above object, according to one aspect of the present invention, there is provided a liquid-metal cooled fast reactor, in which claddings of a nuclear fuel rod in an inner reactor core region, a nuclear fuel rod in a middle reactor core region and a nuclear fuel rod in an outer reactor core region are formed at different thicknesses, thereby being able to effectively flatten power distribution using a single-enrichment nuclear fuel.

Advantageous Effects

According to the present invention, the claddings of the nuclear fuel rods in the respective reactor core region of the liquid-metal cooled fast reactor are formed at different thicknesses, and more particularly, the thicknesses of the claddings are formed to be decreased in the order of the inner, middle and outer reactor core regions, and thus the diameters of the nuclear fuel materials are formed to be increased in the order of the inner, middle and outer reactor core regions, so that the present invention can flatten the power distribution by simplifying the method of realizing a single enrichment, improve the soundness of the nuclear fuel assembly by simplifying the design of the nuclear fuel assembly and the soundness of each nuclear fuel rod, thus resulting in improved economy.

DESCRIPTION OF DRAWINGS

FIG. 8 is a table showing the major design specification of a reactor core in accordance with the present invention

DESCRIPTION OF SYMBOLS OF THE MAIN PARTS IN THE DRAWINGS

Figure 1:
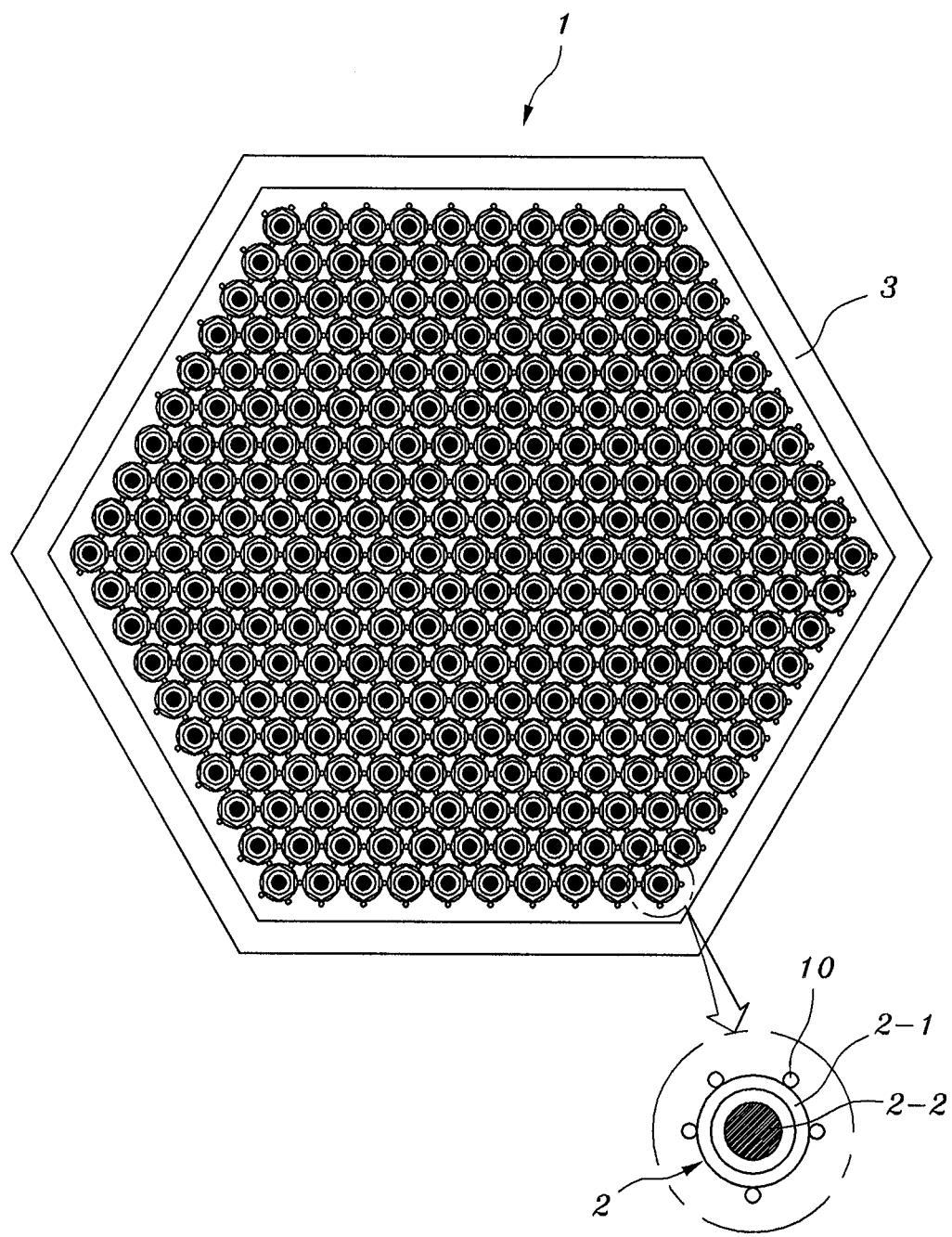
FIG. 1 is a sectional view illustrating a nuclear fuel assembly.

1: nuclear fuel assembly
2: cross section of nuclear fuel rod
3: duct
4: structure of nuclear fuel rod
5: loaded model of reactor core
6: reflector assembly
7: B4C shield assembly
8: IVS (In-Vessel Storage Unit)
9: shield assembly
10: wire wrap

BEST MODE

According to one aspect of the present invention, there is provided a liquid-metal cooled fast reactor, in which claddings of a nuclear fuel rod in an inner reactor core region, a nuclear fuel rod in a middle reactor core region and a nuclear fuel rod in an outer reactor core region are formed at different thicknesses, thereby being able to effectively flatten power distribution using a single-enrichment nuclear fuel.

The cladding of the nuclear fuel rod in the inner reactor core region has a thickness of 1.02 mm.

The nuclear fuel material portion of the nuclear fuel rod in the inner reactor core region has a diameter of 6.03 MM.

The cladding of the nuclear fuel rod in the middle reactor core region has a thickness of 0.74 mm.

The nuclear fuel material portion of the nuclear fuel rod in the middle reactor core region has a diameter of 6.51 mm.

The cladding of the nuclear fuel rod in the outer reactor core region has a thickness of 0.59 mm.

The nuclear fuel material portion of the nuclear fuel rod in the outer reactor core region has a diameter of 6.77 mm.

MODE FOR INVENTION

Reference will now be made in greater detail to exemplary embodiments of the invention with reference to the accompanying drawings.

Figure 2:
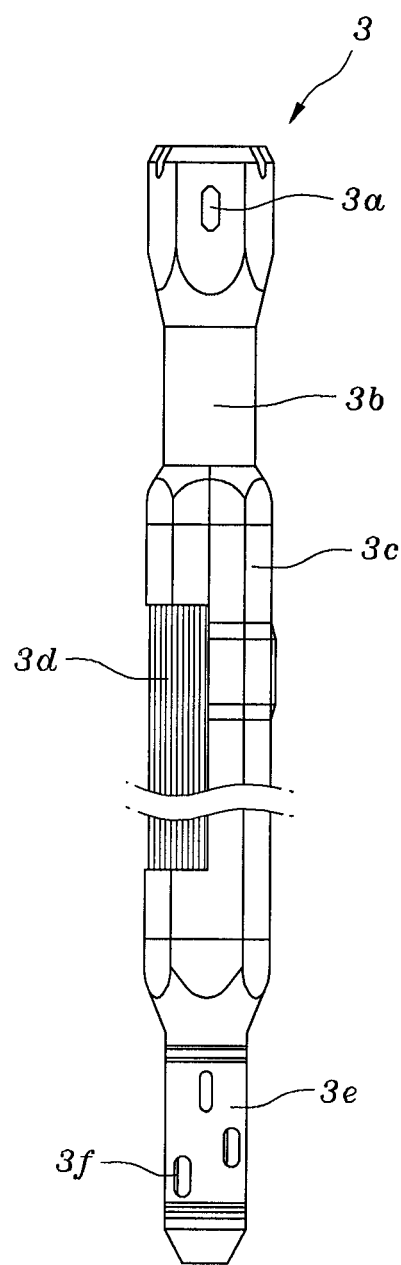
FIG. 2 is a top plan view illustrating an assembly duct model.
Figure 3:
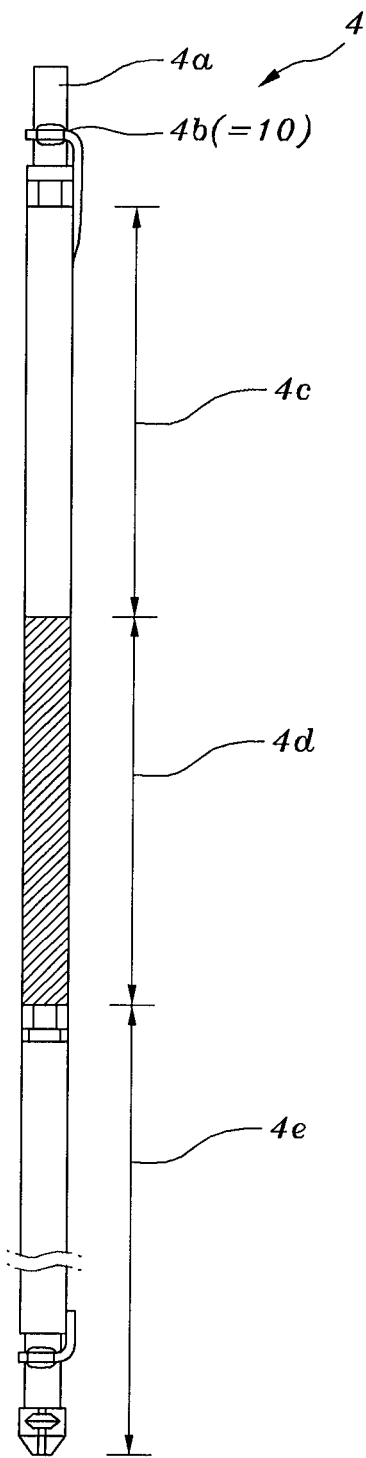
FIG. 3 is a top plan view illustrating a nuclear fuel rod model.
Figure 4:
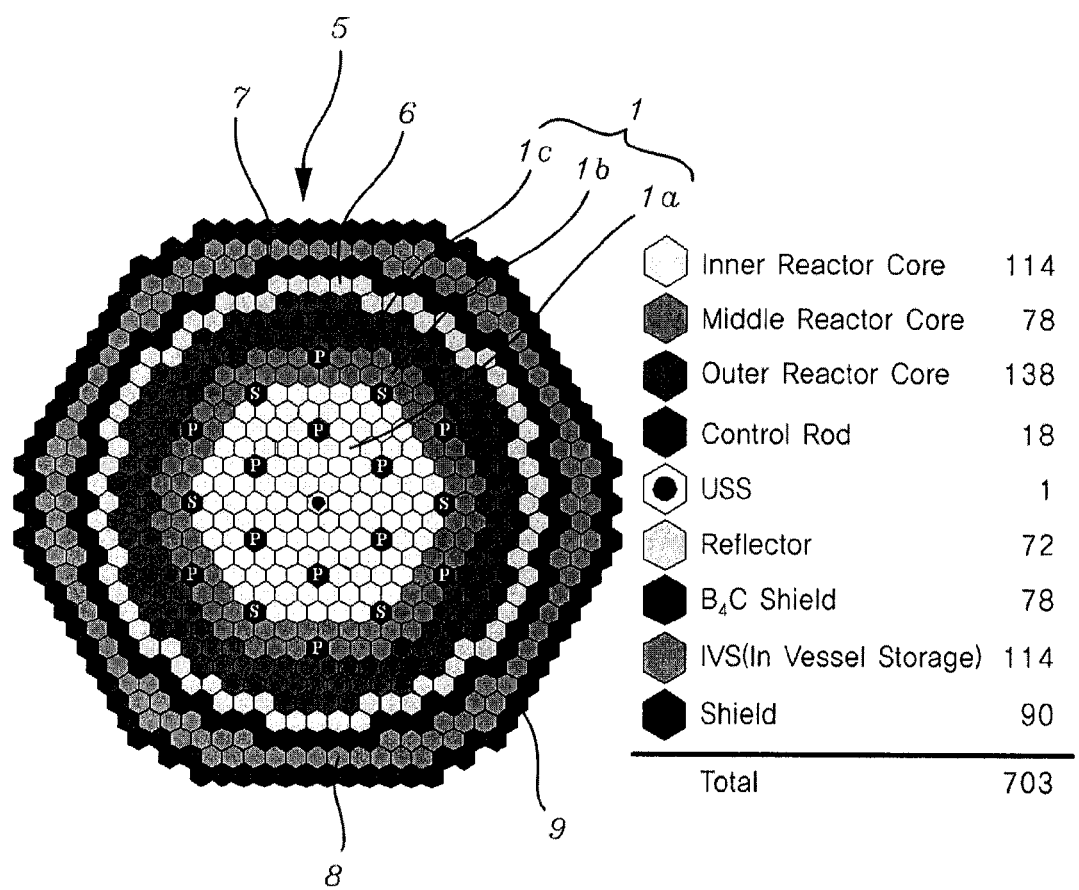
FIG. 4 is a schematic diagram illustrating the loaded state of a reactor core in each reactor core region in accordance with the present invention.
Figure 5:
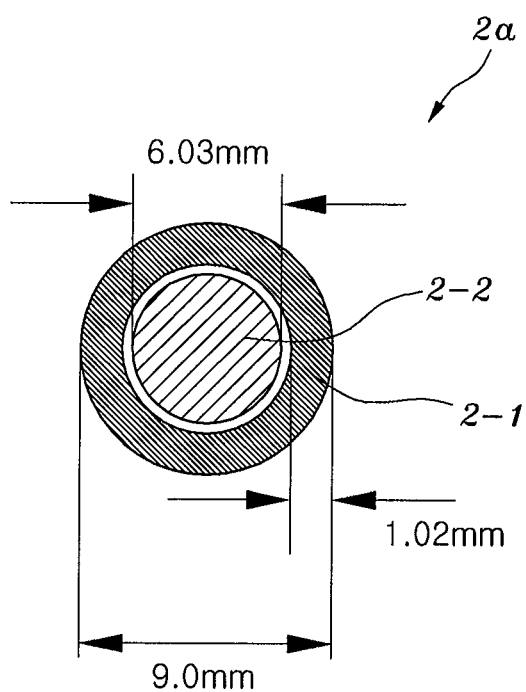
FIG. 5 is a sectional view illustrating a nuclear fuel rod in an inner reactor core in accordance with the present invention.
Figure 6:
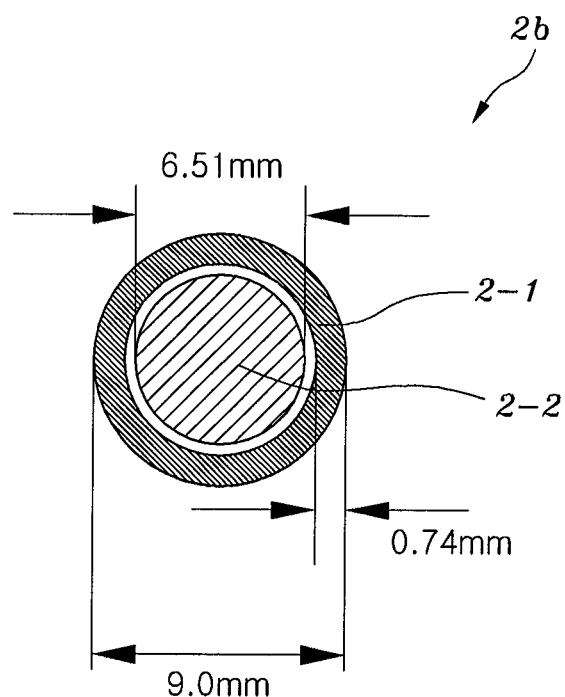
FIG. 6 is a sectional view illustrating a nuclear fuel rod in a central reactor core in accordance with the present invention.
Figure 7:
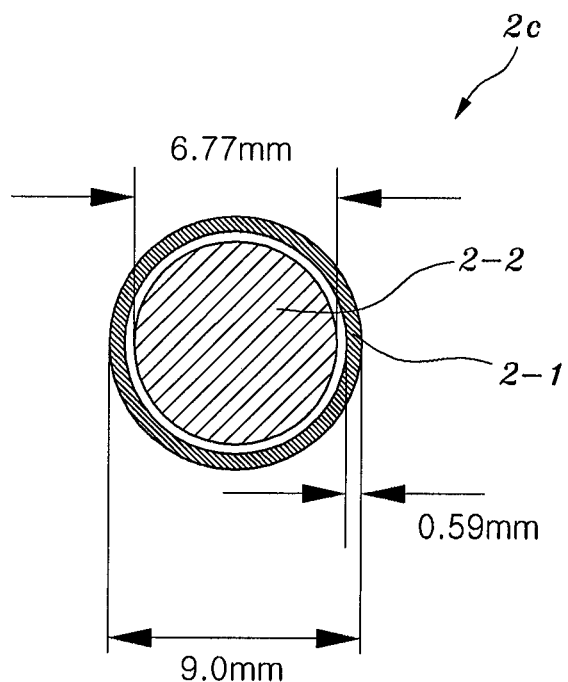
FIG. 7 is a sectional view illustrating a nuclear fuel rod in an outer reactor core in accordance with the present invention.

FIG. 1 is a sectional view illustrating a nuclear fuel assembly. FIG. 2 is a top plan view illustrating an assembly duct model. FIG. 3 is a top plan view illustrating a nuclear fuel rod model. FIG. 4 is a schematic diagram illustrating the loaded state of a reactor core in each reactor core region in accordance with the present invention. FIG. 5 is a sectional view illustrating a nuclear fuel rod in an inner reactor core in accordance with the present invention. FIG. 6 is a sectional view illustrating a nuclear fuel rod in a central reactor core in accordance with the present invention. FIG. 7 is a sectional view illustrating a nuclear fuel rod in an outer reactor core in accordance with the present invention. FIG. 8 is a table showing the major design specification of a reactor core in accordance with the present invention.

As illustrated in FIGS. 1, 2 and 3, a nuclear fuel assembly 1 is made up of 271 nuclear fuel rods 4.

At this time, the nuclear fuel rods 4 are installed in a hexagonal duct 3, and sodium coolant is provided between the ducts 3.

The duct 3 has a thickness of 3.7 mm, the distance between the outer faces of the duct 3 is 18.31 cm, and the distance between the inner faces of the duct 3 is 17.57 cm (see FIG. 8).

A sodium region between the ducts 3 has a thickness of 4 mm, and a pitch of the nuclear fuel assembly 1 is 18.71 cm (see FIG. 8).

The duct 3 makes uniform the flow resistance of all channels therein and in a bundle of the nuclear fuel rods 4, mitigates a by-pass phenomenon, in which the sodium coolant flows along a path having low flow resistance, and forces the sodium coolant to flow around all of the nuclear fuel rods 4 in the bundle of the nuclear fuel rods 4 such that the sodium coolant uniformly flows. Thereby, the duct 3 of the nuclear fuel assembly 1 makes it possible to function as an orifice.

Further, the duct 3 structurally supports the bundle of nuclear fuel rods 4, and 271 nuclear fuel rods 4 form a hexagonal bundle in a triangular arrangement in the duct 3. Each nuclear fuel rod 4 is mounted on a mounting rail through mechanical connection.

The mounting rail is mechanically connected to the upper end of a nose piece 3e.

The nose piece 3e supports the lower portion of the nuclear fuel assembly 1, and provides an inlet for the sodium coolant.

When the nuclear fuel rods 4 are arranged in a triangular shape in the duct 3, a wire wrap 10 is used to maintain an interval between the nuclear fuel rod 4 and the nuclear fuel rod 4.

The wire wrap 10 is bonded and welded to upper and lower end plugs at opposite ends of each nuclear fuel rod 4 so as to be wound around each nuclear fuel rod 4 at regular intervals, thereby functioning to maintain the interval between the nuclear fuel rods 4 and the interval between the nuclear fuel rods 4 and the duct 3, and increase the flow mixture of the sodium coolant.

The wire wrap 10 has a diameter of 1.4 mm, and each nuclear fuel rod 4 has an outer diameter of 9.0 mm. Further, the ratio of the pitch P of a grid and the diameter D of each nuclear fuel rod 4 is 1.1667 (see FIG. 8).

Each nuclear fuel rod 4 has a shielding region 4e for the bottom end cap at a lower end thereof and for a Mod. HT9 cladding, and the shielding region 4e has a length of 111.76 cm.

The upper side of the shielding region 4e is a nuclear fuel region 4d, the length of which is 100 cm. The nuclear fuel material in the nuclear fuel region 4d is surrounded by a cladding, and a sodium bonding agent is disposed between the nuclear fuel material and the cladding.

Sodium of the sodium bond has good compatibility with other material as well as good thermal conductivity, and thus serves to maintain low temperature distribution of the nuclear fuel core.

Among the sodium that is present between the nuclear fuel material and the cladding while the nuclear fuel is burnt, some penetrates the nuclear fuel material due to the expansion of the nuclear fuel material, and the rest moves in an upward direction.

Each nuclear fuel rod has a gas plenum region 4c at the upper portion thereof, which holds gas generated by nuclear fission and lowers the pressure in a cladding tube.

The gas generated from the nuclear fuel by nuclear fission goes up to the gas plenum region 4c together with the sodium.

The gas plenum region 4c has a length of 156.25 cm. The upper side of the gas plenum region 4c is an upper end plug 4a, the length of which is 2.54 cm. Thus, the total length of each nuclear fuel rod 4 is 370.55 cm (see FIG. 8).

As illustrated in FIG. 4, the reactor core region having the nuclear fuel is divided into three regions: inner, middle and outer.

The inner, middle and outer reactor core regions have 114, 78 and 138 nuclear fuel rods 4 respectively, which constitute the nuclear fuel assembly 1. 72 reflector assemblies 6 are disposed at the outer boundary of the reactor core region having the nuclear fuel, and 78 B4C shield assemblies 7, 114 in-vessel storage units (IVSs) 8, and 90 shield assemblies 9 are disposed outside the reflector assemblies 6 in that order.

As illustrated, at this time, the reactor core completely obviates a blanket assembly in order to alleviate resistance based on fears of nuclear proliferation.

Among the reactor core regions, the inner reactor core region constitutes a nuclear fuel assembly 1a, the middle reactor core region surrounding the nuclear fuel assembly 1a of the inner reactor core region constitutes a nuclear fuel assembly 1b, and the outer reactor core region surrounding the nuclear fuel assembly 1b of the middle reactor core region constitutes a nuclear fuel assembly 1c. In the nuclear fuel assembly 1 of the liquid-metal cooled fast reactor, which is installed in the hexagonal duct 3 with the nuclear fuel materials 2-2a, 2-2b and 2-2c surrounded by the claddings 2-1a, 2-1b and 2-1c, the claddings 2-1a, 2-1b and 2-1c of the nuclear fuel rod 2a in the inner reactor core region, the nuclear fuel rod 2b in the middle reactor core region and the nuclear fuel rod 2c in the outer reactor core region are formed at different thicknesses.

In this manner, by forming the claddings 2-1a, 2-1b and 2-1c of the nuclear fuel rods 2a, 2b and 2c in the reactor core regions at different thicknesses, the power distribution can be flattened.

Here, the thickness of the cladding 2-1a of the nuclear fuel rod 2a in the inner reactor core region is most preferably 1.02 mm. The thickness of the cladding 2-1b of the nuclear fuel rod 2b in the middle reactor core region is most preferably 0.74 mm. The thickness of the cladding 2-1c of the nuclear fuel rod 2c in the outer reactor core region is most preferably 0.59 mm.

However, the outer diameters of the nuclear fuel rods 2a, 2b and 2c are equally maintained in order to equally maintain areas of the channels in all reactor core regions.

Further, the nuclear fuel makes use of an ordinary TRU-U-10Zr metal fuel, and the smear density of the metal fuel is 75% TD, and is maintained consistent in all of the reactor core regions.

To the end, the diameter of the nuclear fuel material 2-2a of the nuclear fuel rod 2a in the inner reactor core region is most preferably 6.03 mm. The diameter of the nuclear fuel material 2-2b of the nuclear fuel rod 2b in the middle reactor core region is most preferably 6.51 mm. The diameter of the nuclear fuel material 2-2c of the nuclear fuel rod 2c in the outer reactor core region is most preferably 6.77 mm.

In other words, the main feature of the present invention is that in order to flatten the power distribution using the single-enrichment nuclear fuel, the cladding 2-1a of the nuclear fuel rod 2a in the inner reactor core region is thickest, whereas the cladding 2-1c of the nuclear fuel rod 2c in the outer reactor core region is thinnest.

Thus, the liquid-metal cooled fast reactor having the nuclear fuel assembly 1 in accordance with the present invention can secure good reactor-core performance, and can simultaneously flatten power distribution using the single-enrichment nuclear fuel.

In the drawings and specification, typical exemplary embodiments of the invention have been disclosed, and although specific terms are employed, they are used in a generic and descriptive sense only and not for the purposes of limitation, the scope of the invention being set forth in the following claims.

INDUSTRIAL APPLICABILITY

As described above, according to the present invention, the claddings of the nuclear fuel rods in the respective reactor core region of the liquid-metal cooled fast reactor are formed at different thickness, and more particularly, the thicknesses of the claddings are formed so as to decrease in the order of the inner, middle and outer reactor core regions, and the diameters of the nuclear fuel materials are formed so as to increase in the order of the inner, middle and outer reactor core regions, so that the power distribution can be flattened by simplifying the method of realizing single enrichment, so that the soundness of the nuclear fuel assembly and the soundness of each nuclear fuel rod can be improved by simplifying the design of the nuclear fuel assembly, and so that the improvement of economy can be realized.

The invention claimed is:

1. A liquid-metal cooled fast reactor core having a fuel reactor core comprising:

a first nuclear fuel assembly in an inner reactor core region at a center of the fuel reactor core, a second nuclear fuel assembly in a middle reactor core region surrounding the first nuclear fuel assembly of the inner reactor core region, and a third nuclear fuel assembly in an outer reactor core region surrounding the second nuclear fuel assembly of the middle reactor core region, wherein the fuel reactor core is installed in a hexagonal duct, wherein each of the first, the second and the third nuclear fuel assembly respectively includes a plurality of first nuclear fuel rods in the inner reactor core region, a plurality of second nuclear fuel rods in the middle reactor core region and a plurality of third nuclear fuel rods in the outer reactor core region, wherein each of the plurality of first nuclear rods includes a first nuclear fuel material surrounded by a first cladding, wherein each of the plurality of second nuclear rods includes a second nuclear fuel material surrounded by a second cladding, wherein each of the plurality of third nuclear rods includes a third nuclear fuel material surrounded by a third cladding, wherein diameters of each of the plurality of first, each of the plurality of second and each of the plurality of third nuclear fuel rods are the same, wherein a thickness of the first cladding is thicker than a thickness of the second cladding and a thickness of the second cladding is thicker than a thickness of the third cladding, wherein each of the plurality of first, the plurality of second and the plurality third nuclear rods maintains an interval with one another by wire wrap located among the each of the plurality of first, the plurality of second and the plurality of third nuclear rods.

2. The liquid-metal cooled fast reactor core as set forth in claim 1, wherein the first cladding of each of the plurality of first nuclear fuel rods in the inner reactor core region has a thickness of 1.02 mm.

3. The liquid-metal cooled fast reactor core as set forth in claim 1 or 2, wherein the first nuclear fuel material of each of the plurality of first nuclear fuel rods in the inner reactor core region has a diameter of 6.03 mm.

4. The liquid-metal cooled fast reactor core as set forth in claim 1, wherein the second cladding of each of the second nuclear fuel rods in the middle reactor core region has a thickness of 0.74 mm.

5. The liquid-metal cooled fast reactor core as set forth in claim 1 or 4, wherein the second nuclear fuel material of each of the second nuclear fuel rods in the middle reactor core region has a diameter of 6.51 mm.

6. The liquid-metal cooled fast reactor core as set forth in claim 1, wherein the third cladding of each of the plurality of third nuclear fuel rods in the outer reactor core region has a thickness of 0.59 mm.

7. The liquid-metal cooled fast reactor core as set forth in claim 1 or 6, wherein the third nuclear fuel material of each of the plurality of third nuclear fuel rod in the outer reactor core region has a diameter of 6.77 mm.

* * * * *